US006588017B1

(12) United States Patent
Calderone (10) Patent No.: US 6,588,017 B1
(45) Date of Patent: Jul. 1, 2003

(54) MASTER AND SLAVE SUBSCRIBER STATIONS FOR DIGITAL VIDEO AND INTERACTIVE SERVICES

(75) Inventor: Theodore Calderone, San Carlos, CA (US)

(73) Assignee: Diva Systems Corporation, Redwood City, CA (US)

( * ) Notice: Subject to any disclaimer, the term of this patent is extended or adjusted under 35 U.S.C. 154(b) by 0 days.

(21) Appl. No.: 09/239,058

(22) Filed: Jan. 27, 1999

(51) Int. Cl.$^7$ ................................................ H04N 7/173
(52) U.S. Cl. .................................... 725/120; 725/80
(58) Field of Search ............................. 725/120, 119, 725/78, 80, 82

(56) References Cited

U.S. PATENT DOCUMENTS

| | | | | |
|---|---|---|---|---|
| 5,318,450 A | * | 6/1994 | Carver | 434/336 |
| 5,574,964 A | | 11/1996 | Hamlin | 455/3.1 |
| 5,610,916 A | | 3/1997 | Kostreski et al. | 370/487 |
| 5,654,751 A | * | 8/1997 | Richard, III | 348/192 |
| 5,754,651 A | | 5/1998 | Blatter et al. | 380/20 |
| 5,828,403 A | * | 10/1998 | DeRodeff et al. | 348/7 |
| 5,920,801 A | * | 7/1999 | Thomas et al. | 455/3.1 |
| 6,069,621 A | * | 5/2000 | Schupak | 345/327 |
| 6,188,397 B1 | * | 2/2001 | Humpleman | 345/327 |
| 6,202,211 B1 | * | 3/2001 | Williams, Jr. | 725/78 |

FOREIGN PATENT DOCUMENTS

| EP | 0 917 355 A1 | 5/1999 | H04N/5/00 |
|---|---|---|---|
| WO | WO 97/19554 | 5/1997 | H04N/7/10 |

* cited by examiner

Primary Examiner—Victor R. Kostak
(74) Attorney, Agent, or Firm—Moser, Patterson & Sheridan, LLP (57) ABSTRACT

A master subscriber station is provided that supports a relatively low cost slave subscriber station. The slave subscriber station relies upon the master subscriber station for certain functions and therefore can be implemented as a lower cost design. Duplication of functionality is therefore minimized, resulting in lower complexity and lower overall costs. The master subscriber station has the ability to process multiple video streams such that one or more of the additional streams can be sent via coaxial cabling to a slave subscriber station, as well as receive and process user control signals from the slave subscriber station. The slave subscriber has the ability to receive and demodulate video and audio streams sent by the master subscriber station, as well as send user control commands back to the master subscriber station over the same coaxial cable that delivers the video streams to the slave subscriber station.

55 Claims, 9 Drawing Sheets

```
FROM STEP
   706
     │
     ▼
┌─────────────────┐     ┌─────────────────────┐
│ Receiving Analog│     │ Demodulating Analog │
│ Modulated Signal│────▶│ Modulated Signal to │
│ From Master     │     │ Obtain Analog       │
│ Station         │     │ Baseband Signal For │
│      708        │     │ Second Program      │
│                 │     │        710          │
└─────────────────┘     └─────────────────────┘
                                   │
                                   ▼
┌─────────────────┐     ┌─────────────────────┐
│ Displaying      │     │ Generating Analog   │
│ Second Program  │◀────│ Display Signal      │
│ on Slave Display│     │ Carrying Baseband   │
│      714        │     │ Signal For Second   │
│                 │     │ Program             │
│                 │     │        712          │
└─────────────────┘     └─────────────────────┘
```

FIG. 7B

MASTER AND SLAVE SUBSCRIBER STATIONS FOR DIGITAL VIDEO AND INTERACTIVE SERVICES

BACKGROUND OF THE INVENTION

1. Field of the Invention

This invention relates generally to the distribution of video and interactive services. More particularly, this invention relates to subscriber stations for receiving digital video programs and supporting interactive services.

2. Description of the Background Art

Distribution of digital video programs via cable television systems or direct broadcast satellite (DBS) is becoming increasingly popular. In addition, distribution of interactive services such as video on-demand services and Internet (including World Wide Web) access is also becoming increasingly popular.

Many homes now have a subscriber station or terminal that provides access to digital video programming. The subscriber station is typically in the form of a stand-alone set-top box. The stand-alone set-top box receives signals over a cable system, a direct broadcast system, or other distribution system. Of particular significance, the stand-alone set-top box supports only a single television (or monitor or other display-device). If a user wants to support another television (or monitor or other display device), then a second stand-alone set-top box is typically required. Moreover, if the user wants to support a third television (or monitor or other display device), then a third stand-alone set-top box is typically required. And so on for additional televisions. The need for multiple identical stand-alone set-top boxes to support multiple televisions is significant extra cost to the user and/or the service provider.

SUMMARY OF THE INVENTION

The present invention overcomes the above-described disadvantages by providing a master subscriber station that supports a relatively low cost slave subscriber station. The slave subscriber station relies upon the master subscriber station for certain functions and therefore can be implemented as a lower cost design. Duplication of functionality is therefore minimized, resulting in lower complexity and lower overall costs.

One distinction of the master subscriber station over a conventional stand-alone set-top box is the master subscriber station's ability to process multiple video streams such that one or more of the additional streams can be sent via coaxial cabling to a slave subscriber station. Another distinction is the master subscriber station's ability to receive and process control signals from the slave subscriber station. In a preferred embodiment of the present invention, the master subscriber station can also function as a stand-alone unit with minimal modifications.

One distinction of the slave subscriber station over a conventional stand-alone set-top box is the slave subscriber station's ability to receive and demodulate video and audio streams sent by the master subscriber station. Another distinction is the slave subscriber station's ability to send remote control commands back to the master subscriber station over the same coaxial cable that delivers the video streams to the slave subscriber station. For example, in a video-on-demand (VOD) application, the slave subscriber station may send a command indicating a movie selection to the master subscriber station. As another example, in a digital video broadcast application, the slave subscriber station may send a command indicating that a broadcast channel selection to the master subscriber station.

In a preferred embodiment of the present invention, the slave subscriber station includes a relatively low-speed RF (radio frequency) modem (modulator/demodulator) to communicate with the master unit. This allows the slave subscriber station to be of substantially reduced cost and complexity because a substantial portion of the cost and complexity of a conventional stand alone set-top box lies in the RF tuner, IF (intermediate frequency) amplifier, and QAM demodulator circuitry. Also, in a preferred embodiment of the present invention, the slave subscriber station is housed in a small, inexpensive enclosure and uses a wall transformer to supply power.

In a preferred embodiment of the present invention; advantage is taken of the fact that the digital bit rate of a single video program (e.g., a movie) which is compressed according the MPEG (motion picture expert group) standard can be as low as 1.544 megabits per second (Mb/s), whereas the digital bit rate capacity of a standard 6 megahertz (MHz) analog CATV channel can be as high as 27 Mb/s for 64 QAM (quadrature amplitude modulation) and as high as 38.8 Mb/s for 256 QAM. The relatively large digital bandwidth of the standard analog CATV channel allows several digital MPEG channels to be packaged and transmitted within a single standard analog. CATV channel.

Unlike a conventional stand-alone digital set-top box which selects and demultiplexes only one MPEG digital channel at any one time, the master subscriber station is able to select and demultiplex multiple MPEG digital channels at any one time. One digital channel may be displayed on a television coupled to the master subscriber station, and a different (or the same) digital channel may be displayed on each of the slave subscriber stations. Furthermore, a second master subscriber station (possibly in a different residence in the same neighborhood) tuned to the same 6 MHz CATV channel as the first master-set top box mentioned above would be able to select and demultiplex different (or the same) digital channels as the first master subscriber station.

These and other features and advantages of the present invention may be better understood by considering the following detailed description of a preferred embodiment of the invention. In the course of this description, reference will frequently be made to the attached drawings.

DETAILED DESCRIPTION OF THE PREFERRED EMBODIMENTS

First Embodiment

Figure 1:
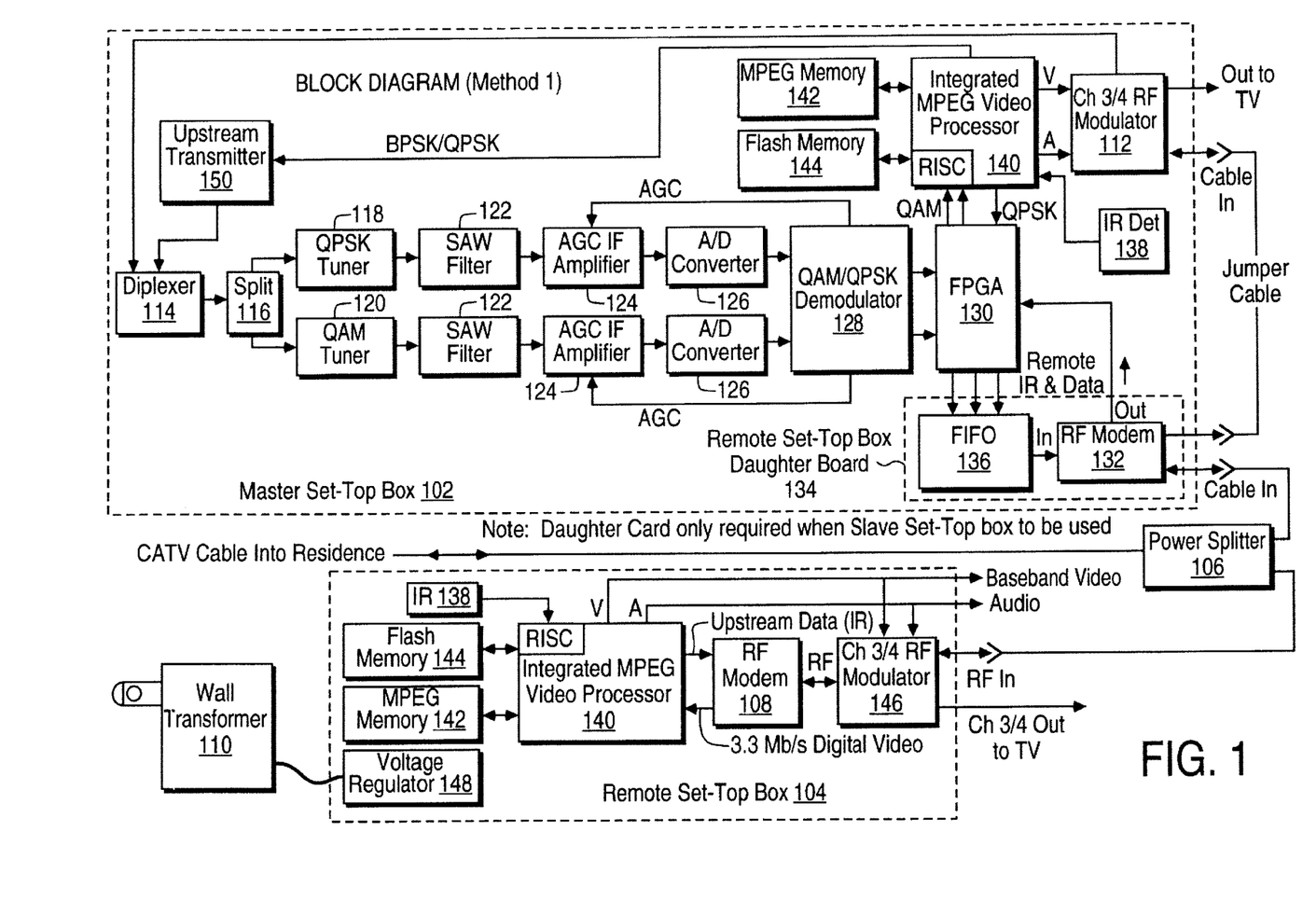
FIG. 1 is a schematic diagram including master and slave (remote) subscriber stations (set-top boxes) according to a first embodiment of the present invention.

FIG. 1 is a schematic diagram including a master subscriber station (set-top box) 102 and a slave (remote) subscriber station (set-top box). 104 according to a first embodiment of the present invention. The master 102 and slave 104 subscriber stations are both coupled to a power splitter 106 which in turn is coupled to a CATV (community antenna television or cable television) cable. The subscriber stations 102 and 104 may be set-top boxes, or they may alternatively be integrated with a television, a computer system, or other equipment.

In one preferred embodiment of the present invention, the CATV cable enters into a residence which includes the master 102 and one or more slave 104 subscriber stations. For example, the master subscriber station 102 may be in a family room and slave subscriber stations 104 may be in bedrooms or other rooms. In another preferred embodiment of the present invention, the CATV cable enters into a business which includes the master 102 and, one or more slave 104 subscriber stations. For example, the business may be a hotel with a slave subscriber stations 104 in the rooms or suites of the hotel.

According to a preferred embodiment of the present invention, the master subscriber station 102 is backward compatible with analog broadcasts in that it may operate in either an analog mode or a digital mode. In digital mode, the master subscriber station 102 is set-up by the cable head-end 302 to receive a specified 6 MHz QAM digitally modulated RF carrier containing the digital video programs destined to subscriber stations (102 and/or 104) fed by the head-end 302. In a VOD application, the digital video programs may be movies in compressed digital format. In a digital video broadcast application, the digital video programs may be broadcast programs in compressed digital format.

According to a preferred embodiment of the present invention, the set-up of the master subscriber station 102 by the cable head-end 302 occurs via an out-of-band control channel. Control commands sent via the out-of-band control channel instructs the RF tuner in the master subscriber station 102 to tune to the CATV channel containing the desired digital video.

According to a preferred embodiment of the present invention, since several digital video streams may be contained in a single 6 MHz CATV channel, the digital video streams are differentiated and identified by program identifier (PID) tags located in the header of the digital MPEG packets carrying the video. The master subscriber station 102 is informed (also via the out-of-band control channel) which PID tag or tags identify video programs to be displayed on the television attached to the, master unit 102 and/or on the televisions attached to the slave subscriber stations 104 which are under the control of the master unit 102. In this way, each master subscriber station 102 can ignore superfluous data and process only the video and audio streams intended for viewing within the residence or business.

In the embodiment shown in FIG. 1, the master subscriber station 102 is capable of demultiplexing a second encoded digital video and audio stream and sending the encoded stream to the slave subscriber station 104 via a digitally encoded carrier. The slave subscriber station 104 converts the signal from the digitally encoded carrier back into the encoded digital stream and then decodes the encoded digital stream to generate baseband video and audio signals for display on the television attached to the slave subscriber station.

Master's Front End

Turning in detail to FIG. 1, the master subscriber station 102 receives both digital and analog RF carriers at the "F" connector of the conventional channel ¾ RF modulator 112. Preferably, the channel ¾ modulator 112 also serves as a RF bypass device so that the analog carrier may be forwarded to the associated television when the master subscriber station 102 is not being used.

When the master subscriber station 102 is being used, in either analog or digital mode, the broadband RF signal at the "F" connector is routed to a diplexer 114. The diplexer 114 splits high frequencies and low frequencies into two separate ports while maintaining a constant input impedance. The high frequency port of the diplexer 114 feeds a 1:2 power splitter 116. The outputs of the power splitter 116 feeds two RF tuners, the QPSK (quadrature phase-shift keying) "out-of-band" tuner 118 and the combination QAM "in-band" and analog tuner 120.

The output of the QAM in-band tuner 120 is filtered by a 6 MHz SAW (surface acoustic wave) filter 122 which rejects all frequencies except in the range from 41 to 47 MHz. The output of the SAW filter 122 feeds an AGC (automatic gain control) amplifier 124 where the IF (intermediate frequency) signal is amplified and down converted to a 5 MHz baseband signal. The AGC amplifier 124, as the name implies, is also the point in the system where the signal level is maintained at a constant. The output of the AGC amplifier 124 feeds an A/D (analog-to-digital) converter 126 with a constant signal level. The digital output of the A/D converter 126, which is byte-wide at this point, is fed into a QAM/QPSK demodulator 128 which converts the digitized QAM carrier into an error corrected 27 MHz digital bit stream. The QAM/QPSK demodulator 128 also provides the gain control voltage that is fed back to both the QAM and QPSK AGC amplifiers 124.

Similar to the output of the QAM in-band tuner 120, the output of the QPSK out-of-band tuner 118 feeds a SAW filter 122, which in turn feeds an AGC amplifier 124, which inturn feeds an A/D converter 126, which in turn feeds the same QAM/QPSK demodulator 128.

One may consider the QAM/QPSK demodulator 128 as acting as an interface between the analog and digital portions of the master subscriber station 102. The 27 Mb/s broadband digital signal from the QAM/QPSK demodulator 128 is fed into a FPGA (field programmable gate array) 130.

The master subscriber station 102 also includes an IR (infrared) detector 138 for receiving infrared signals generated by a remote or user control unit for the master subscriber station 102. A video processor 140 with a RISC (reduced instruction set computer) core and associated temporary storage memory 142 and longer-term non-volatile memory 144 operate in a conventional manner to generate video and audio signals for use by a television. The video processor 140 preferably takes the form of a conventional integrated MPEG video processor programmed to generate analog video and analog signals from MPEG encoded video and audio data packets. The video processor 140 is also programmed to process commands from the infrared detector 138 and to respond in an appropriate fashion. The analog video and audio signals generated by the video processor 140 are modulated by RF modulator 112 onto an RF carrier and sent to the television. Alternatively, or in addition, the analog video and audio signals generated by the video processor 140 may be provided as separate baseband outputs for the television. In addition, the RISC processor embedded in the video processor 140 supplies upstream signals in BPSK/QPSK (binary phase-shift keying/quadrature phase-shift keying) form to upstream transmitter 150.

Figure 2:
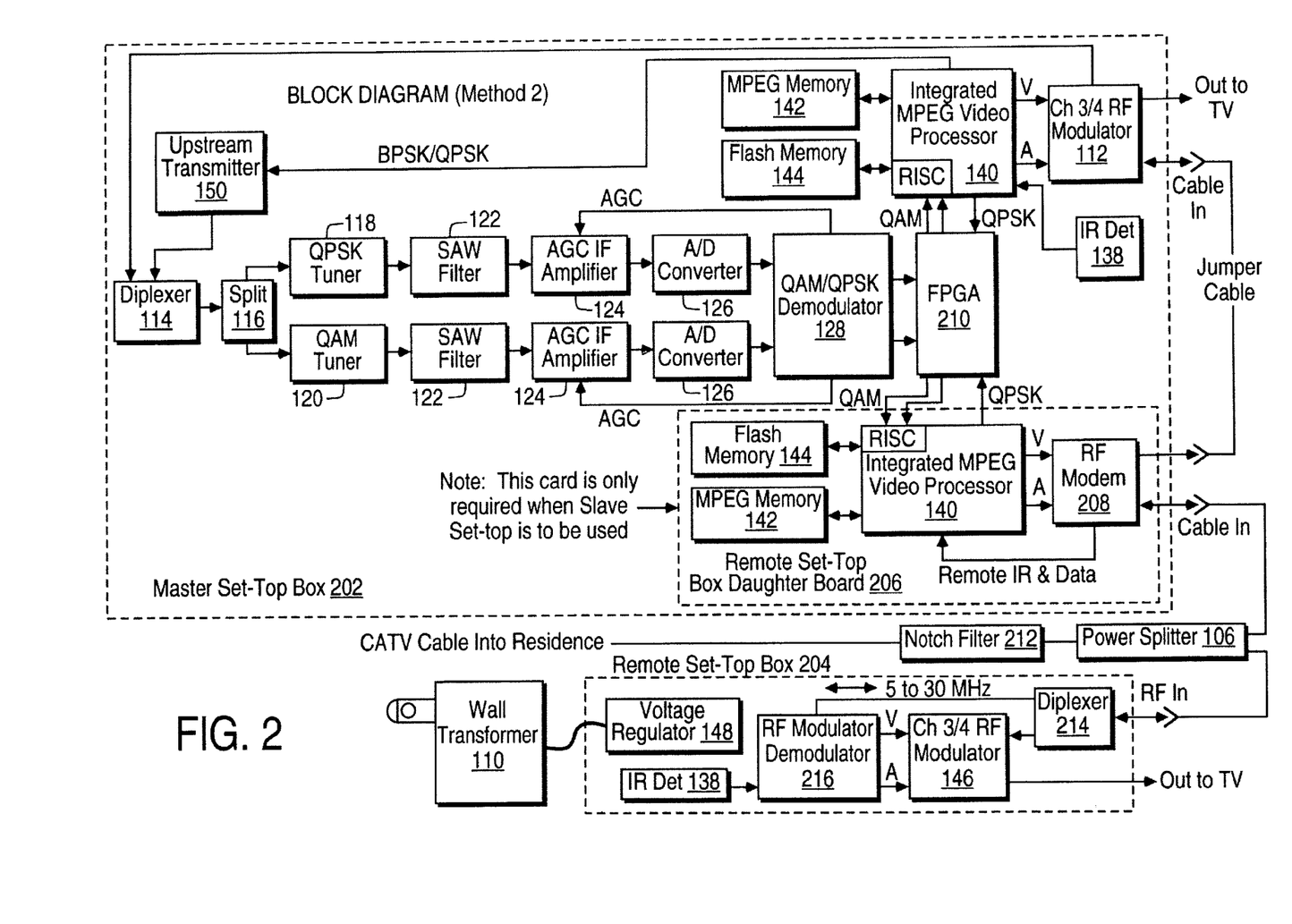
FIG. 2 is a schematic diagram including master and slave (remote) subscriber stations (set-top boxes) according to a second embodiment of the present invention.

The above detailed description covers the "front-end" circuitry of the master subscriber station 102 which is common to the two embodiments shown in FIGS. 1 and 2. The "back-end" circuitry and the method of operation thereof is different between the two embodiments shown in FIGS. 1 and 2.

Master's Back End in First Embodiment

In FIG. 1, the FPGA 130 is programmed to filter or select the specific video and audio MPEG packets destined for the slave subscriber station 104. The FPGA 130 also sends control data packets destined for the slave subscriber station 104 alongside the video and audio MPEG packets destined for the slave subscriber station 104. By combining the control data packets with the video and audio data packets destined for the slave subscriber station 104, the need for an additional out-of-band carrier between the two boxes is eliminated. In addition, the FPGA 130 processes the user control data coming from the slave subscriber station 104 via a RF (radio frequency) modem 132 on a daughter board 134 mounted within the master subscriber station 102.

For each slave subscriber station 104, there corresponds such a daughter board 134 in the master subscriber station 102. The daughter board 134 may be implemented on a separate printed circuit board, or alternatively the chips of the daughter board 134 may be integrated onto the mother board of the master subscriber station 102.

The selected control, video, and audio packets which are output from the FPGA 130 as bursts of 27 Mb/s are sent to a FIFO (first in first out) buffer 136 on the daughter board 134. The function of the FIFO 136 is to take the bursty packets and, generate a lower but constant bit rate. The output frequency of the FIFO 136 is determined by the combination of control, video, audio, and null (or "stuffing") packets. The null packets are used to tune the clocking frequency and therefore the output frequency of the FIFO 136 to allow the use of a convenient clock frequency already available in the master subscriber station 102. The output from the FIFO 136 drives the input to the RF modem 132 which converts the digital bit stream to a digitally modulated RF carrier signal.

The digitally modulated RF carrier signal output by the RF modem 132 is sent downstream to the slave subscriber station 104 via coaxial cabling. In addition, the RF modem 132 in the master subscriber station 102 is capable of receiving an upstream signal transmitted from the slave subscriber station 104. The upstream signal from the slave subscriber station 104 is a low bit rate signal which is an RF modulated version of the control commands that are typically received from the IR remote control associated the slave subscriber station 104. The carrier frequencies for both the upstream and downstream communications between the master subscriber station 102 and the slave subscriber station 104 are either below 5 MHz, between 40 and 50 MHz, or above several hundred MHz, preferably above the highest frequency digital carriers to prevent interference with CATV and digital programming signals.

Slave in First Embodiment

In FIG. 1, the slave subscriber station 104 is simpler and less costly than the master subscriber station 102 because most of the RF signal processing and the in-band and out-of-band signaling takes place in the master subscriber station 102. The slave subscriber station 104 performs primarily the MPEG video and audio decoding function. As shown in FIG. 1, the slave subscriber station 104 includes a RF modem 108, a conventional channel ¾ modulator 146, a video processor 140, associated temporary 142 and longer-term 144 memories, an infrared detector 138, and power conditioning electronics 148 to accommodate low cost wall transformer operation.

The conventional channel ¾ RF modulator 146 receives both digital and analog RF carriers. Preferably, the channel ¾ modulator 146 also serves as a RF bypass device so that the analog carrier may be forwarded to the associated television when the slave subscriber station is not being used.

When the slave subscriber station 104 is being used, the RF modem 108 in the slave subscriber station 104 receives and demodulates a 4 to 5 Mb/s FSK (frequency-shift keying) or PSK (phase-shift keying) modulated bit stream which carries the control, video, and audio packets from the master subscriber station 102. The RF modem 108 also sends the low speed user control signals from the IR detector 138 in the slave subscriber station 104 to the master subscriber station 102 using a separate digitally modulated carrier.

The slave subscriber station 104 in FIG. 1 preferably provides conventional baseband video and stereo outputs, S-Video outputs, and a channel ¾ RF output. The power for the slave subscriber station 104 is preferably supplied by the wall-type transformer 110, and power conditioning and voltage regulation 148 is performed on the main circuit board of the slave subscriber station 104.

Second Embodiment

FIG. 2 is a schematic diagram including master and slave (remote) subscriber stations (set-top boxes) according to a second embodiment of the present invention. Similar to the first embodiment, the second embodiment uses the RF front-end of the master subscriber station 202 to process the digitally modulated carrier containing the 27 MHz digital video bit stream. However, in contrast to the first embodiment, the digital-to-analog (D/A) conversion and the MPEG decoding for the slave subscriber station 204 is performed on the daughter board 206 inside the master subscriber station 202.

One advantage of the embodiment shown in FIG. 2 is that the complexity and cost of the slave subscriber station 204 is reduced. A further advantage of the embodiment shown in FIG. 2 is that copy protection is stronger since the signal between the master 202 and remote 204 subscriber stations is analog instead of digital. This makes it more difficult to copy the digital signal. The method of transmission between the master 202 and remote 204 subscriber stations can be either amplitude modulation (AM) or preferably frequency modulation (FM) in order to get the best signal quality and noise immunity.

Master's Back End in Second Embodiment

In FIG. 2, the master subscriber station 202 is capable of demultiplexing and decoding a second encoded digital video and audio stream to generate baseband video and audio signals. The master subscriber station 202 sends these baseband video and audio signals to the slave subscriber station 204.

The daughter card 206 within the master subscriber station 202 contains a video processor 140, associated memory (142 and 144), and an RF modem 208. Alternatively, the chips from the daughter board 206 may be integrated into the main board of the master subscriber station 202.

The FPGA 210 sends digitally modulated signals carrying the control, video, and audio data to the video processor 140 located on the daughter card 206. Preferably, the video processor 140 selects only the control, video, and audio data packets which are tagged for delivery to the slave subscriber station 204 and ignores packets with other identification tags (packet identifiers or PIDs). This function is called PID filtering.

In addition to PID filtering, the video processor 140 on the daughter card 206 performs the following functions: MPEG decoding, video memory management, NTSC encoding, downstream out-of-band signal processing, remote-to-master signal processing, and on-screen display.

The RF modem 208 on the daughter card 206 receives baseband video and, audio signals from the processor 140 and transmits these video and audio signals to the slave subscriber station 204 via a modulated carrier. The modulated carrier is typically an amplitude modulation (AM) or frequency modulation (FM) carrier. The RF modem 208 also receives and demodulates a carrier that originates from the slave subscriber station 204 which contains signals from the infrared remote for the slave subscriber station 204.

The bandwidth required for the upstream transmission from the slave subscriber station 204 to the master subscriber station 202 is only that necessary to relay the user control signals which typically have a bandwidth of a few kilohertz (KHz). The downstream bandwidth required to transport the video and audio carriers from the master subscriber station 202 to the slave subscriber station 204 depends on the type of modulation chosen, but the video and audio information bandwidth combined will typically require about 6 MHz total. This number takes into account the additional bandwidth required to accommodate the roll-off from the 4.2 MHz video signal and the two audio carriers.

Slave in Second Embodiment

In accordance with FIG. 2, the slave subscriber station includes a RF modem 216, a diplexer 214, a channel ¾ RF modulator 146, a voltage regulator 148, and an infrared detector 138.

A notch filter 212 as shown in the second embodiment may also be used between the CATV cable and the power splitter 106. The notch filter 212 is able to reduce port-to-port isolation (for example, from about 20–30 dB to about 8–10 dB) between the set-top boxes such that they can communicate to each other at the frequency to which the notch filter 212 is tuned. At the same time, the notch filter 212 is able to substantially prevent the communication signals from escaping from the residence. Note that such a notch filter 212 may also be used to advantage in the first embodiment.

Figure 3:
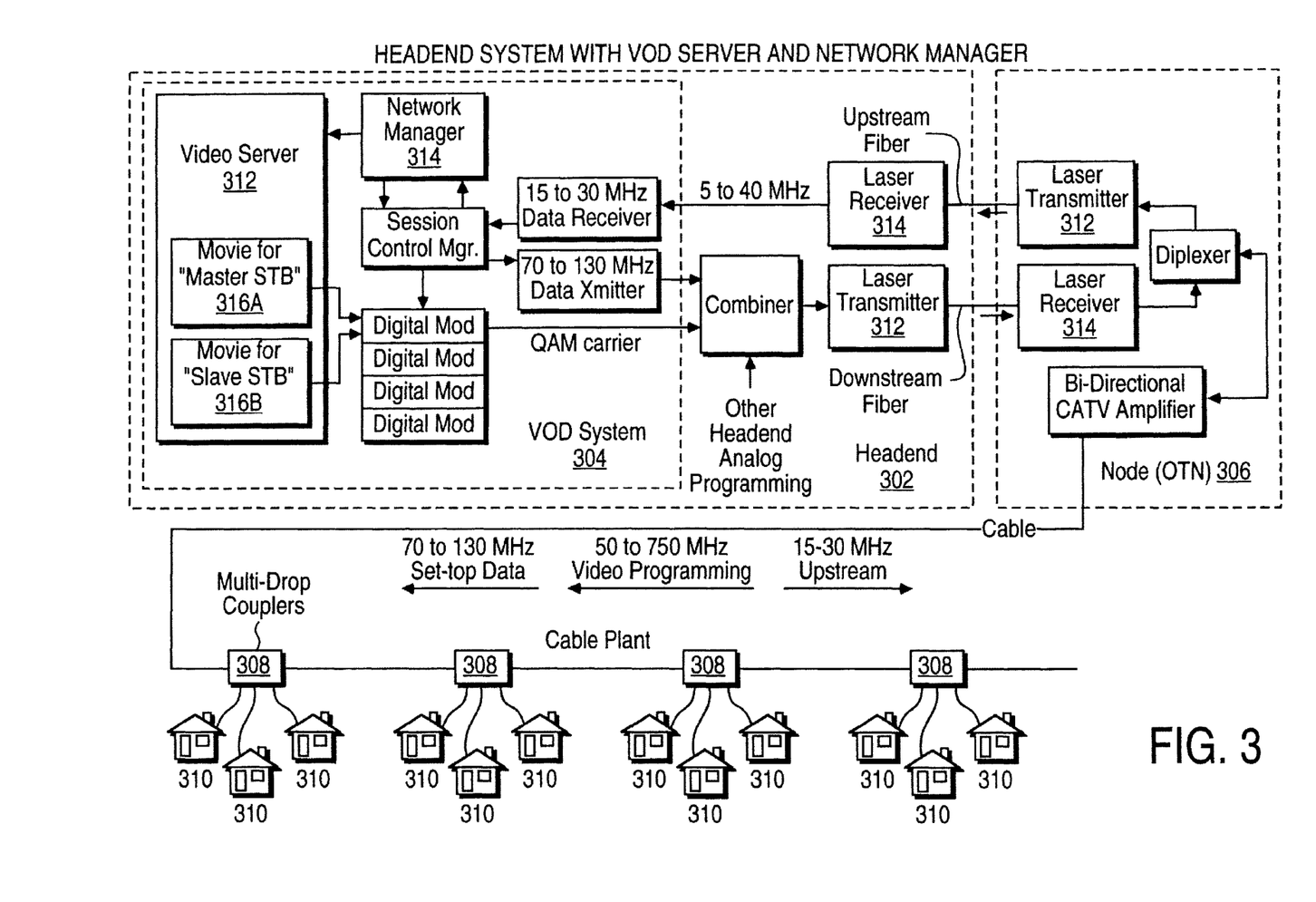
FIG. 3 is a schematic diagram of a video-on-demand (VOD) service including a VOD server and a network manager within a head-end of a cable distribution system in accordance with a preferred embodiment of the present invention.

FIG. 3 is a schematic diagram of a video-on-demand (VOD) service including a VOD server 312 and a network manager 314 within a head-end 302 of a cable distribution system in accordance with a preferred embodiment of the present invention. The VOD service illustrated in FIG. 3 is incorporated into a conventional hybrid fiber coax (HFC) distribution system and includes a VOD system 304 within a cable head-end 302, distribution nodes 306, and multi-drop couplers 308 to various end user systems (residences or businesses) 310.

The couplings between the headend 302 and the nodes 306 are via optical fiber (and laser transmitters 312 and laser receivers 314) while the couplings between the nodes 306 and the end-user systems 310 are via coaxial cable. The coaxial cable from the node 306 to the multi-drop couplers is typically capable of carrying downstream 50 to 750 MHz of video programming and 70 to 130 MHz of set-top data to the end-user system 310, and 15–30 MHz of upstream data from the end-user system 310.

As illustrated in FIG. 3, the video server 312 may provide, for example, two movies 316A and 316B. The first movie 316A may have been requested by and destined for delivery to a master subscriber station (master STB) of a particular end-user system 310. The second movie 316B may have been requested by and destined for delivery to a slave subscriber station (slave STB) under control of the master subscriber station.

Figure 4:
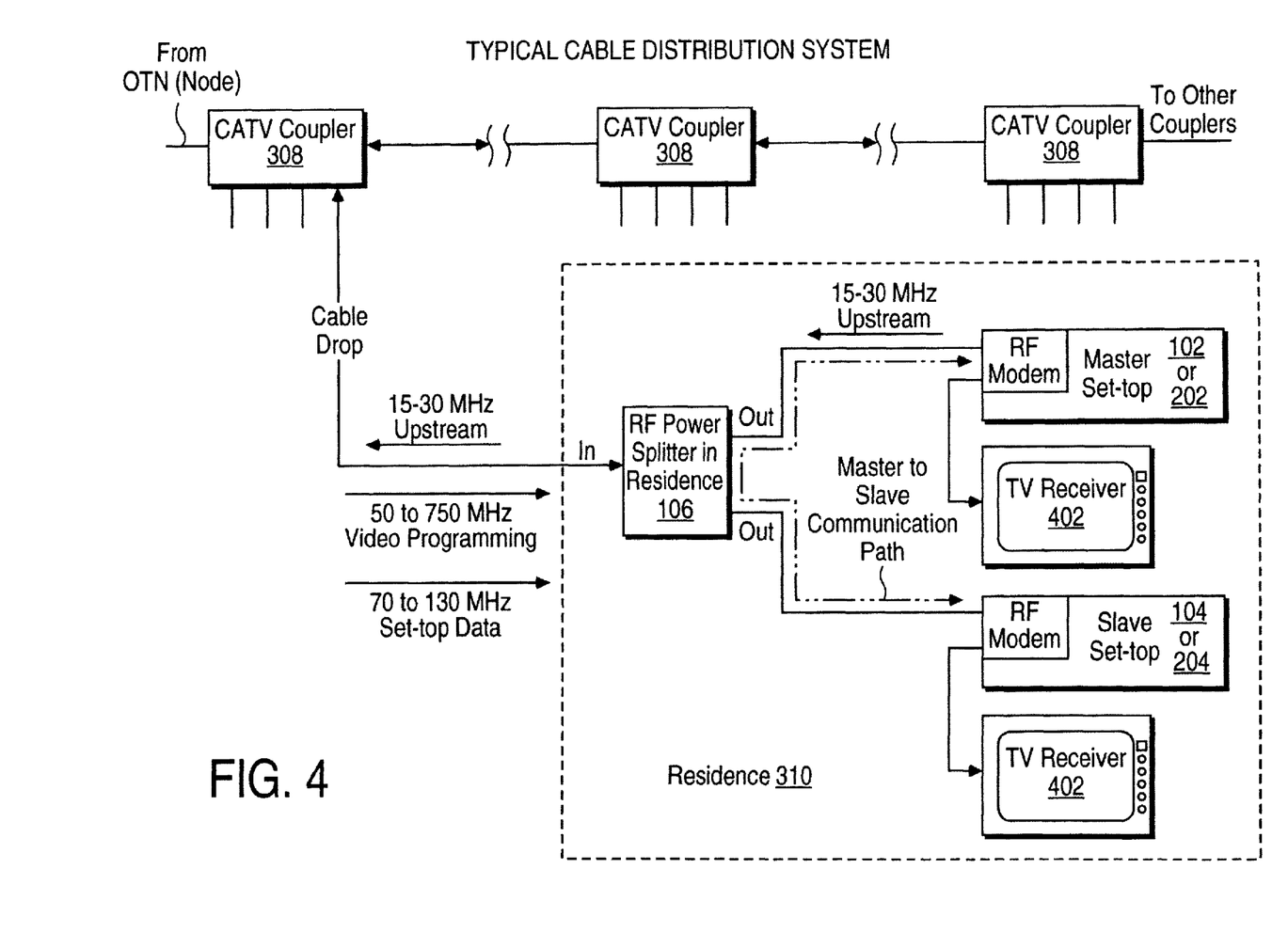
FIG. 4 is a schematic diagram of a portion of a cable distribution system from multi-drop couplers to TV receivers in accordance with a preferred embodiment of the present invention.

FIG. 4 is a schematic diagram of a portion of a cable distribution system from multi-drop couplers 308 to TV receivers 402 within an end-user system (residence or business) 310 in accordance with a preferred embodiment of the present invention. Like the coaxial cable between the nodes 306 and the multi-drop couplers 308, the cable drop from the couplers 308 to the end-user systems 310 is typically capable of carrying downstream 50 to 750 MHz of video programming and 70 to 130 MHz of set-top data and 15–30 MHz of upstream data.

Figure 5:
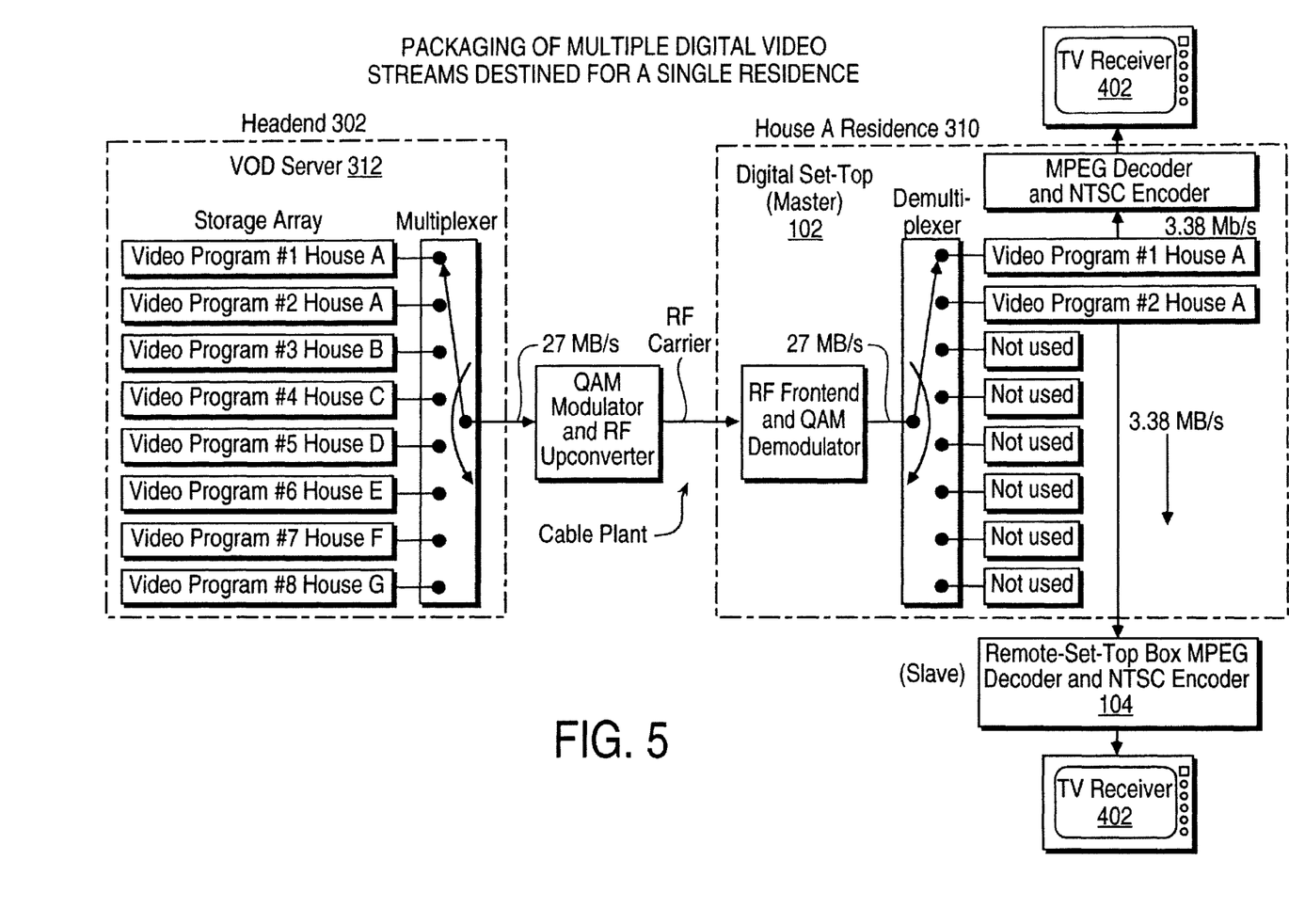
FIG. 5 is a schematic diagram illustrating the distribution of multiple video programs from a VOD server to a residence in accordance with a preferred embodiment of the present invention.

FIG. 5 is a schematic diagram illustrating the distribution of multiple video programs from a VOD server 312 to an end-user system (residence or business) 310 in accordance with a preferred embodiment of the present invention. The example illustrated in FIG. 5 shows eight different video programs (#1–#8) destined for delivery to seven different residences (A–G).

In particular, two video programs (#1 and #2) are destined for House A. As shown in FIG. 5, House A receives all eight video programs (#1–#8), but only video programs #1 and #2 are identified by their PIDs as being destined for House A. Therefore, the master subscriber station 102 in House A ignores all but those two video programs. As shown in FIG. 5, video program #1 is decoded by the master subscriber station 102 and displayed on the TV receiver 402 associated with the master subscriber station 102. Meanwhile, video program #2 is decoded by the slave subscriber station 104 and displayed on the TV receiver 402 associated with the slave subscriber station 104.

Figure 6A:
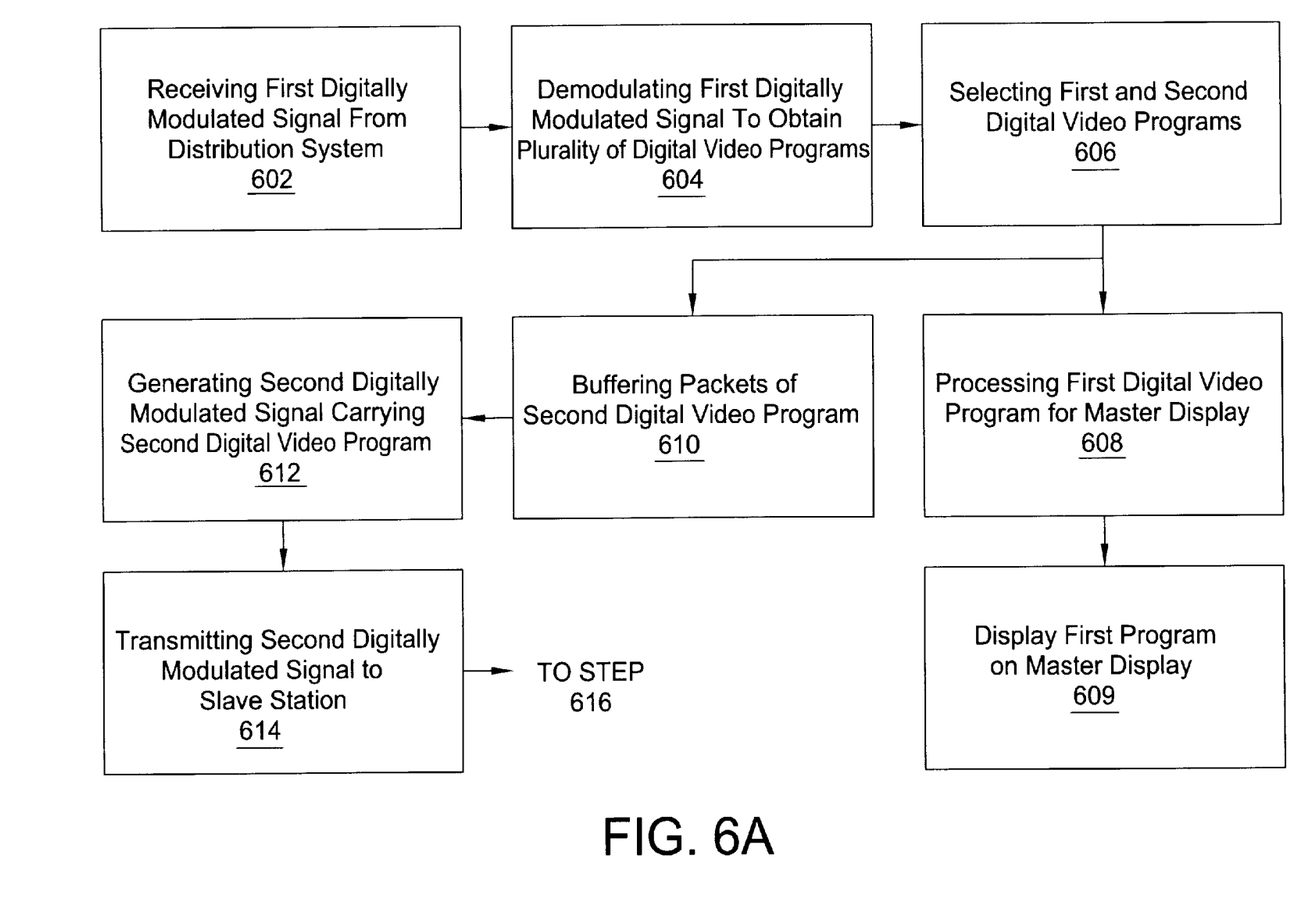
FIG. 6A is a flow chart illustrating the basic method of operation of the master subscriber station in FIG. 1.

FIG. 6A is a flow chart illustrating the basic method of operation of the master subscriber station 102 in FIG. 1.

The process begins with the step 602 of receiving a first digitally modulated signal carrying a plurality of digital video programs (for example, programs #1–8 shown in FIG. 5) from the distribution system. The next step 604 involves demodulating (by QAM demodulator 128) the first digitally modulated signal to obtain the plurality of digital video programs. In the following step 606, the logic device 130 selects a first digital video program destined for the master unit 102 and a second digital video program destined for the slave unit 104.

In a subsequent step 608, the video processor 140 processes the first digital video program for display on a display device associated with the master subscriber station 104. The processing of step 608 involves generating an analog baseband signal for the first program and generating an analog display signal carrying the baseband signal. In step 609 the analog display signal is sent to the master unit's display and the first program is displayed thereon.

In parallel with steps 608 and 609, the master subscriber station 102 also performs steps 610, 612, and 614. In step 610, packets containing the second digital video program are buffered by the FIFO buffer 136 and sent at a relatively constant bit rate to the RF modem 132. In step 612, the RF modem 132 generates a second digitally modulated signal which carries the second digital video program. Next, in step 614, the RF modem 132 transmits the second digitally modulated signal to the slave subscriber station 104.

Figure 6B:
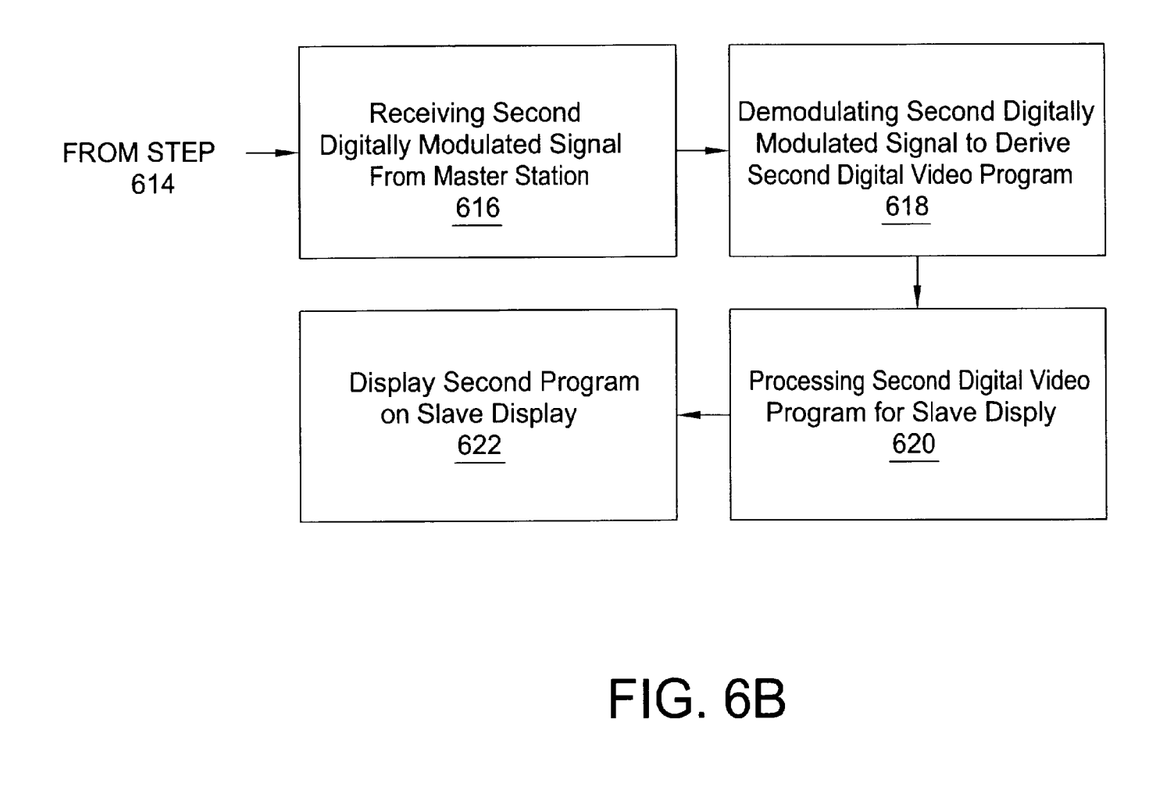
FIG. 6B is a flow chart illustrating the basic method of operation of the slave subscriber station in FIG. 1.

FIG. 6B is a flow chart illustrating the basic method of operation of the slave subscriber station 104 in FIG. 1. The process in FIG. 6B is a continuation of the process of FIG. 6A.

The process continues in step 616 when the slave subscriber station 104 receives the second digitally modulated signal from the master subscriber station 102. In step 618, the RF modem 108 of the slave subscriber station 104 demodulates the second digitally modulated signal to derive a second digital video program. Next, in step 620, the video processor 140 processes the second digital video program for display on a display device associated with the slave subscriber station 104. The processing of step 620 involves generating an analog baseband signal for the second program and generating an analog display signal carrying the baseband signal. Finally, in step 622, the analog display signal is sent to the slave unit's display and the second program is displayed thereon.

Figure 7A:
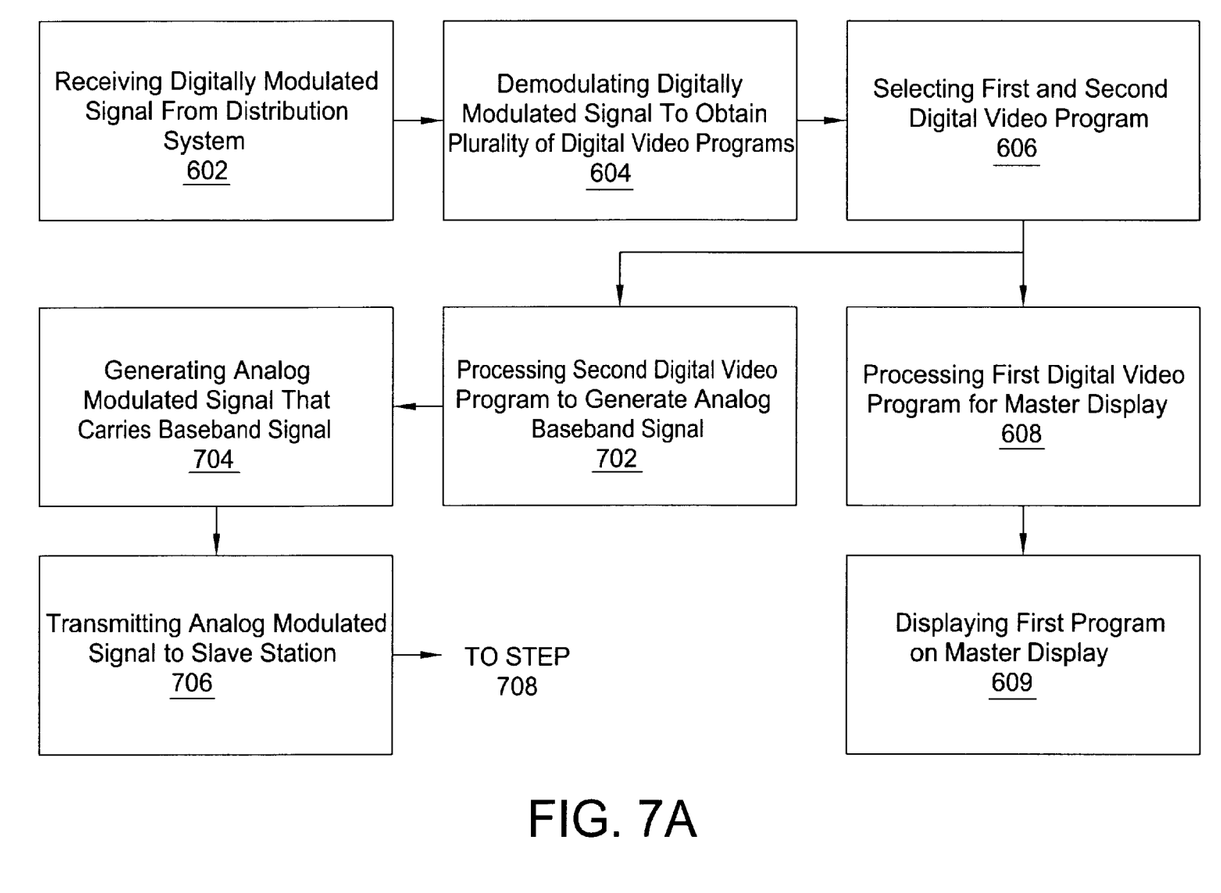
FIG. 7A is a flow chart illustrating the basic method of operation of the master subscriber station in FIG. 2.

FIG. 7A is a flow chart illustrating the basic method of operation of the master subscriber station 202 in FIG. 2. FIG. 7A has steps 602, 604, 606, 608, and 609 in common with FIG. 6A.

In parallel with steps. 608 and 609, the master subscriber station 202 also performs steps 702, 704, and 706. In step 702, the second digital video program is processed by the video processor 140 on the daughter card 206 to generate an analog baseband signal. In step 704, the RF modem 208 generates an analog modulated signal which carries the baseband signal. Next, in step 706, the analog modulated signal is transmitted by the RF modem 208 to the slave subscriber station 204.

Figure 7B:
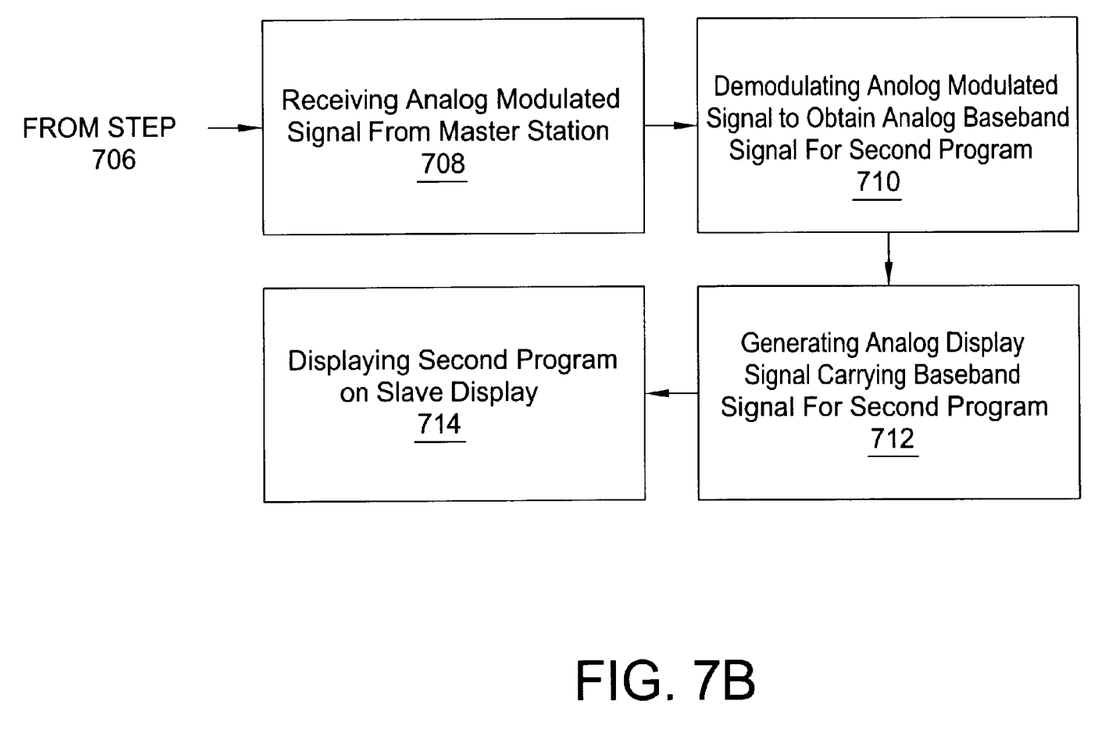
FIG. 7B is a flow chart illustrating the basic method of operation of the slave subscriber station in FIG. 2.

FIG. 7B is a flow chart illustrating the basic method of operation of the slave subscriber station 204 in FIG. 2. The process in FIG. 7B is a continuation of the process of FIG. 7A.

The process continues in step 708 when the slave subscriber station 204 receives the analog modulated signal from the master subscriber station 202. In step 710, the RF modem 216 of the slave subscriber station 204 demodulates the analog modulated signal to derive an analog baseband signal for the second program that is sent to the channel ¾ modulator 146. Next, in step 712, the channel ¾ modulator 146 generates an analog display signal carrying the baseband signal for the second program. Finally, in step 714, the analog display signal is sent to the slave unit's display, and the second program is displayed thereon.

It is to be understood that the specific mechanisms and techniques which have been described are merely illustrative of one application of the principles of the invention. Numerous additional modifications may be made to the methods and apparatus described without departing from the true spirit of the invention. For example, the communication system between the master and slave set-top boxes may be implemented via a 900 MHz link or via the power lines in a building, instead of via a cable link.

What is claimed is:

1. A master subscriber station for receiving and processing a plurality of digital video programs, the master subscriber station comprising:

a demodulator for receiving a first modulated signal which carries the plurality of digital video programs from a distribution system and for demodulating the first modulated signal to derive a digital signal which includes the plurality of digital video programs;

a logic device for selecting from the digital signal a first digital video program and a second digital video program;

a processor for processing the first digital video program to generate a first video signal for display on a display device which is associated with the master subscriber station; and a modulator for generating a second modulated signal which carries the second digital video program and for transmitting the second modulated signal to a slave subscriber station.

2. The master subscriber station of claim 1, wherein the first modulated signal comprises a digitally modulated signal.

3. The master subscriber station of claim 2, wherein the first modulated signal further comprises an analog modulated signal.

4. The master subscriber station of claim 1, wherein the first modulated signal comprises a radio frequency signal.

5. The master subscriber station of claim 1, wherein the first modulated signal comprises an amplitude modulation signal, and the demodulator comprises an amplitude modulation demodulator.

6. The master subscriber station of claim 1, wherein the first modulated signal comprises a phase modulation signal, and the demodulator comprises a phase modulation demodulator.

7. The master subscriber station of claim 1, wherein the first modulated signal comprises a frequency modulation signal, and the demodulator comprises a frequency modulation demodulator.

8. The master subscriber station of claim 1, wherein the logic device comprises a field programmable gate array.

9. The master subscriber station of claim 1, wherein the first video signal is analog in nature.

10. The master subscriber station of claim 9, wherein the first video signal comprises an analog baseband video signal.

11. The master subscriber station of claim 1, wherein the first video signal includes an audio signal for output to a speaker device which is associated with the master subscriber station.

12. The master subscriber station of claim 1, wherein the second modulated signal comprises a digitally modulated signal.

13. The master subscriber station of claim 1, wherein the second digital video program comprises packets, and the master subscriber station further comprises:

a buffer for receiving the packets of the second digital video program from the processor, and for outputting the packets at a substantially constant bit rate to the modulator.

14. The master subscriber station of claim 13, wherein the substantially constant bit rate is achieved in part by the buffer occasionally outputting null packets to the modulator.

15. The master subscriber station of claim 1, wherein the modulator is located on a daughter card within the master subscriber station.

16. The master subscriber station of claim 1, further comprising a detector for receiving commands from a user control device which is associated with the master subscriber station.

17. The master subscriber station of claim 16, wherein the commands are processed to generate control signals, and the control signals comprise digitally modulated signals.

18. The master subscriber station of claim 17, wherein the control signals may be sent to the logic device.

19. The master subscriber station of claim 17, further comprising:
an upstream transmitter which receives control signals for transmission to a manager device via the distribution system.

20. The master subscriber station of claim 19, wherein the upstream transmitter further receives additional control signals from a slave subscriber station for transmission to the manager device via the distribution system.

21. A master subscriber station for, receiving and processing a plurality of digital video programs, the master subscriber station comprising:
a demodulator for receiving a first modulated signal which carries the plurality of digital video programs from a distribution system and for demodulating the first modulated signal to derive a digital signal which includes the plurality of digital video programs;
a logic device for selecting from the digital signal a first digital video program and a second digital video program;
a first processor for processing the first digital video program to generate a first video signal for display on a display device which is associated with the master subscriber station;
a second processor for processing the second digital video program to generate a second video signal for display on a second display device which is associated with a slave subscriber station; and
a modulator for generating a second modulated signal which carries the second video signal and for transmitting the second modulated signal to a slave subscriber station.

22. The master subscriber station of claim 21, wherein the second video signal comprises an analog baseband video signal, and the second modulated signal comprises an analog modulated signal.

23. The master subscriber station of claim 22, wherein the analog modulated signal comprises an amplitude modulated signal.

24. The master subscriber station of claim 22, wherein the analog modulated signal comprises a frequency modulated signal.

25. The master subscriber station of claim 21, wherein the second processor is located on a daughter card within the master subscriber station.

26. The master subscriber station of claim 21, wherein the first modulated signal comprises a digitally modulated signal.

27. The master subscriber station of claim 26, wherein the first modulated signal further comprises an analog modulated signal.

28. The master subscriber station of claim 21, wherein the first modulated signal comprises a radiofrequency signal.

29. The master subscriber station of claim 21, wherein the first modulated signal comprises an amplitude modulation signal, and the demodulator comprises an amplitude modulation demodulator.

30. The master subscriber station of claim 21, wherein the first modulated signal comprises a phase modulation signal, and the demodulator comprises a phase modulation demodulator.

31. The master subscriber station of claim 21, wherein the first modulated signal comprises a frequency modulation signal, and the demodulator comprises a frequency modulation demodulator.

32. The master subscriber station of claim 21, wherein the logic device comprises a field programmable gate array.

33. The master subscriber station of claim 21, wherein the first video signal is analog in nature.

34. The master subscriber station of claim 33, wherein the first video signal comprises an analog baseband video signal.

35. The master subscriber station of claim 21, wherein the first video signal includes an audio signal for output to a speaker device which is associated with the master subscriber station.

36. The master subscriber station of claim 21, further comprising a detector for receiving commands from a user control device which is associated with the master subscriber station.

37. The master subscriber station of claim 36, wherein the commands are processed to generate control signals, and the control signals comprise digitally modulated signals.

38. The master subscriber station of claim 37, wherein the control signals may be sent to the logic device.

39. The master subscriber station of claim 37, further comprising:
an upstream transmitter which receives control signals for transmission to a manager device via the distribution system.

40. The master subscriber station of claim 39, wherein the upstream transmitter further receives additional control signals from a slave subscriber station for transmission to the manager device via the distribution system.

41. Apparatus for receiving and processing a digital video program, comprising:
a master subscriber station, comprising:
a demodulator for receiving a first modulated signal which carries the plurality of digital video programs from a distribution system and for demodulating the first modulated signal to derive a digital signal which includes the plurality of digital video programs;
a logic device for selecting from the digital signal a first digital video program and a second digital video program;
a processor for processing the first digital video program to generate a first video signal for display on a display device which is associated with the master subscriber station; and
a modulator for generating a second modulated signal which carries the second digital video program and for transmitting the second modulated signal to a slave subscriber station; and
said slave subscriber station, comprising:
a demodulator for receiving a digitally modulated signal which carries the digital video program from a master subscriber station and for demodulating the digitally modulated signal to derive the digital video program; and
a processor for processing the digital video program to generate a video signal for display on a display device which is associated with the slave subscriber station.

42. The apparatus of claim 41, wherein the video signal is analog in nature.

43. The apparatus of claim 41, wherein the video signal includes an audio signal for output to a speaker device with is associated with the slave subscriber station.

44. The apparatus of claim 41, further comprising a wall transformer and a voltage regulator for conditioning power for the slave subscriber station.

45. The apparatus of claim 41, further comprising a detector for receiving commands from a user control device that is associated with the slave subscriber station.

46. The apparatus of claim 45, wherein the commands are processed to generate control signals, and the control signals comprise digitally modulated signals.

47. The apparatus of claim 46, wherein the control signals are transmitted from the slave subscriber station to the master subscriber station.

48. Apparatus for receiving and processing a video program, comprising:

- a master subscriber station, comprising:
  - a demodulator for receiving a first modulated signal which carries the plurality of digital video programs from a distribution system and for demodulating the first modulated signal to derive a digital signal which includes the plurality of digital video programs;
  - a logic device for selecting from the digital signal a first digital video program and a second digital video program;
  - a processor for processing the first digital video program to generate a first video signal for display on a display device which is associated with the master subscriber station; and
  - a modulator for generating a second modulated signal which carries the second digital video program and for transmitting the second modulated signal to a slave subscriber station; and
- said slave subscriber station, comprising:
  - a demodulator for receiving an analog modulated signal which carries the video program from a master subscriber station and for demodulating the analog modulation signal to derive an analog baseband signal; and
  - a modulator for generating an analog display signal carrying the analog baseband signal and for transmitting the analog display signal to a display device associated with the slave subscriber station.

49. The apparatus of claim 48, further comprising:

- a detector for receiving commands from a user control device which is associated with the slave subscriber station; and
- a second modulator for generating control signals from the commands, the control signals comprising digitally modulated signals and for transmitting the control signals to the master subscriber station.

50. The apparatus of claim 48, further comprising a wall transformer and a voltage regulator for conditioning power for the slave subscriber station.

51. A method for receiving and processing a plurality of digital video programs, the method comprising:

- receiving a first modulated signal from a distribution system, the first modulated signal being modulated to carry the plurality of digital video programs;
- demodulating the first modulated signal to derive a digital signal which includes the plurality of digital video programs;
- selecting from the digital signal a first digital video program and a second digital video program;
- processing the first digital video program to generate a first video signal for display on a display device which is associated with a master subscriber station;
- generating a second modulated signal which carries the second digital video program; and
- transmitting the second modulated signal to a slave subscriber station.

52. The method of claim 51, further comprising:

buffering packets of the second digital video program so that a substantially constant bit rate is provided to generate the second modulated signal.

53. The method of claim 51, further comprising:

- receiving commands from a user control device which is associated with the master subscriber station;
- processing the commands to generate control signals; and
- transmitting the control signals to a manager device via the distribution system.

54. A method for receiving and processing a plurality of digital video programs, the method comprising:

- receiving a first modulated signal from a distribution system, the first modulated signal being modulated to carry the plurality of digital video programs;
- demodulating the first modulated signal to derive a digital signal which includes the plurality of digital video programs;
- a logic device for selecting from the digital signal a first digital video program and a second digital video program;
- processing the first digital video program to generate a first video signal for display on a display device which is associated with a master subscriber station;
- processing the second digital video program to generate a second video signal for display on a second display device which is associated with a slave subscriber station;
- generating a second modulated signal which carries the second video signal; and
- transmitting the second modulated signal to the slave subscriber station.

55. The method of claim 54, further comprising:

- receiving commands from a user control device which is associated with the master subscriber station;
- processing the commands to generate control signals; and
- transmitting the control signals to a manager device via the distribution system.

* * * * *